US010585914B1

(12) United States Patent
Belmar

(10) Patent No.: US 10,585,914 B1
(45) Date of Patent: Mar. 10, 2020

(54) METHODS AND APPARATUS FOR A DISTRIBUTED SHARED MEMORY FOR DEVICE SYNCHRONIZATION

(71) Applicant: SyncRTC Inc., Madrid (ES)

(72) Inventor: Victor Sanchez Belmar, Madrid (ES)

(73) Assignee: SyncRTC Inc., Madrid (ES)

( * ) Notice: Subject to any disclaimer, the term of this patent is extended or adjusted under 35 U.S.C. 154(b) by 0 days.

(21) Appl. No.: 15/979,207

(22) Filed: May 14, 2018

Related U.S. Application Data

(63) Continuation of application No. 15/378,617, filed on Dec. 14, 2016, now Pat. No. 9,971,826.

(60) Provisional application No. 62/394,253, filed on Sep. 14, 2016.

(51) Int. Cl.
*G06F 16/00* (2019.01)
*G06F 16/27* (2019.01)
*H04L 29/08* (2006.01)

(52) U.S. Cl.
CPC .......... *G06F 16/27* (2019.01); *H04L 67/1095* (2013.01); *G06F 2212/154* (2013.01); *G06F 2212/254* (2013.01)

(58) Field of Classification Search
CPC ..................... G06F 16/27; G06F 2212/254
See application file for complete search history.

(56) References Cited

U.S. PATENT DOCUMENTS

| | | | |
|---|---|---|---|
| 6,151,020 A | 11/2000 | Palmer et al. | |
| 6,529,910 B1 | 3/2003 | Fleskes | |
| 7,421,438 B2 | 9/2008 | Turski et al. | |
| 7,822,708 B1 | 10/2010 | Mathew et al. | |
| 7,953,696 B2 | 5/2011 | Davis et al. | |
| 8,255,461 B1 | 8/2012 | Liu et al. | |
| 8,311,894 B2 | 11/2012 | Nykamp | |
| 8,429,540 B1 | 4/2013 | Yankovich et al. | |
| 8,487,895 B1 | 7/2013 | Brown | |
| 8,935,392 B2 | 1/2015 | Samdadiya et al. | |
| 8,966,445 B2 | 2/2015 | Ahlgren et al. | |
| 9,264,466 B2 | 2/2016 | Graham et al. | |
| 9,390,154 B1 | 7/2016 | Baird, III | |
| 9,971,826 B1 | 5/2018 | Belmar | |

(Continued)

OTHER PUBLICATIONS

Tschudnowsky, A. et al., "Towards Real-Time Collaboration in User Interface Mashups," ICE-B, Aug. 2014, 8 pages.

(Continued)

*Primary Examiner* — Grace Park
(74) *Attorney, Agent, or Firm* — Cooley LLP

(57) ABSTRACT

In some embodiments, an apparatus includes a memory having an instance of a distributed shared memory and a processor operatively coupled to the memory. The processor is configured to instantiate a first instance of a front-end application and receive, at the first instance of the front-end application, and input signal associated with a state of the first instance of the front-end application. The processor is configured to insert a value into a field data structure defined in the instance of the distributed shared memory and associated with an event source configured through a second instance of the distributed shared memory. The processor is configured to generate an event object indicative of the value inserted into the field data structure and send a signal to update the second instance of the front-end application.

19 Claims, 7 Drawing Sheets

(56) References Cited

U.S. PATENT DOCUMENTS

| | | |
|---|---|---|
| 2007/0100902 A1 | 5/2007 | Sinha et al. |
| 2010/0058167 A1 | 3/2010 | Kim et al. |
| 2010/0125550 A1* | 5/2010 | Imamura .............. G06F 16/27 707/613 |
| 2010/0202761 A1 | 8/2010 | Bhogal et al. |
| 2010/0306738 A1 | 12/2010 | Verma et al. |
| 2012/0066610 A1 | 3/2012 | Phillips et al. |
| 2013/0073965 A1 | 3/2013 | Sik et al. |
| 2014/0019995 A1 | 1/2014 | Frank et al. |
| 2014/0207840 A1 | 7/2014 | Smith et al. |
| 2014/0281896 A1 | 9/2014 | Wiitala et al. |
| 2014/0337760 A1 | 11/2014 | Heinrich et al. |
| 2015/0128152 A1 | 5/2015 | Lachaume |
| 2015/0172381 A1 | 6/2015 | Krueger et al. |
| 2015/0312370 A1 | 10/2015 | Chen et al. |

OTHER PUBLICATIONS

Brian M. McDaniel, "The CloudBrowser Web Application Framework," Masters Thesis, May 2, 2012, 92 pages.

* cited by examiner

METHODS AND APPARATUS FOR A DISTRIBUTED SHARED MEMORY FOR DEVICE SYNCHRONIZATION

CROSS-REFERENCE TO RELATED APPLICATION

This application is a Continuation of, and claims priority to and benefit of U.S. patent application Ser. No. 15/378,617, now U.S. Pat. No. 9,971,826, filed on Dec. 14, 2016 and entitled "Methods and Apparatus for a Distributed Shared Memory for Device Synchronization," which in turn claims priority to and the benefit of U.S. Provisional Patent Application No. 62/394,253, filed Sep. 14, 2016 and entitled "Methods and Apparatus for a Distributed Shared Memory for Device Synchronization," which is incorporated herein by reference in its entirety.

FIELD

Embodiments described herein relate generally to the synchronization of front-end applications implemented on multiple compute devices connected in a network.

BACKGROUND

Some known front-end applications use near real-time synchronization in response to users' actions and engagements. For example, an application that renders an indicator representing the geolocation of a user on a digital map can reposition the indicator whenever the user moves from one location to another. Likewise, some known collaborative applications use near real-time synchronization to reflect changes collaborating users make to a document or project.

Some known techniques used to implement front-end application synchronization are computationally expensive and inefficient. For example, screen sharing can be used to send to an instance of an application pixel-by-pixel data at least 30 times per second. For another example, some known front-end applications maintain a centralized persistence of data in servers and/or client devices while the application is being synchronized, adding a load on the servers and synchronized devices. For yet another example, some near real-time collaborative applications use complex algorithms to avoid the collision of actions performed by collaborating users based on special rules similar to the ones implemented in turn-based applications or gaming systems.

Thus, a need exists for improved devices and methods for synchronizing in near real-time front-end application data at a reduced computational cost.

SUMMARY

In some embodiments, an apparatus includes a memory and a processor operatively coupled to the memory. The memory includes an instance of a distributed shared memory at a compute device configured to be included within a set of compute devices that implement the distributed shared memory via a computer network operatively coupled to the set of compute devices. The processor is configured to instantiate a first instance of a front-end application logically coupled to the instance of the distributed shared memory and receive, at the first instance of the front-end application, an input signal associated with a state of the first instance of the front-end application. The processor is configured to insert, based on the input signal, a value into a field data structure defined in the instance of the distributed shared memory. The field data structure is associated with an event source configured through a second instance of the distributed shared memory. The processor is configured to generate, via the event source, an event object indicative of the value inserted into the field data structure and send a signal to update the second instance of the front-end application such that a state of the second instance of the front-end application matches the state of the first instance of the front-end application.

DETAILED DESCRIPTION

Figure 1:
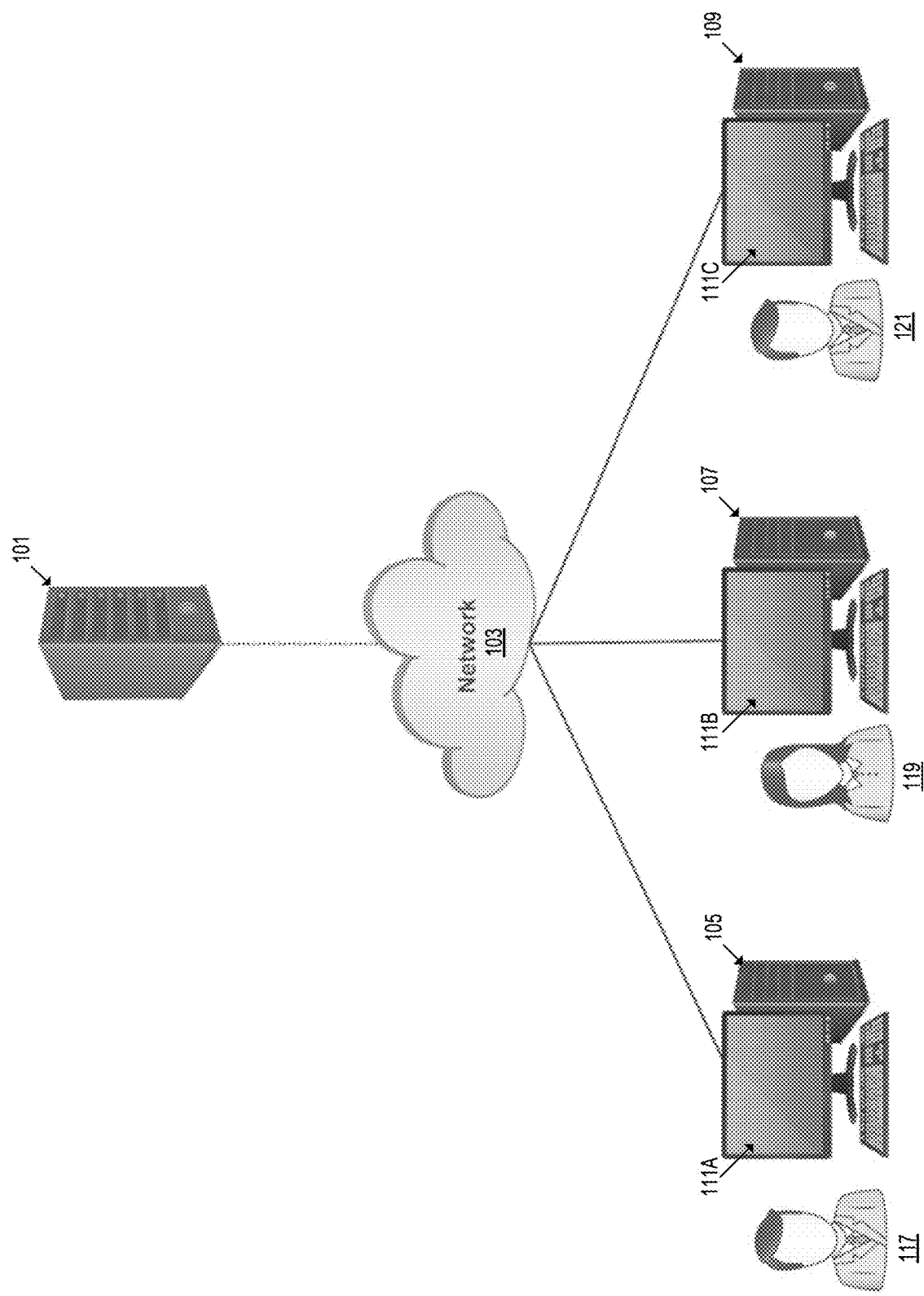
FIG. 1 is a schematic diagram of a system that implements a front-end synchronized application, according to an embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

Applications in which multiple users edit the same data in a particular order, for example, board games, collaborative applications, video games, and other similar multi-user applications, can be challenging to implement because it is difficult to estimate whether at any given moment a user has made changes to the state of the front-end application. As noted above, some known techniques used to implement front-end application synchronization in near real-time are computationally expensive and inefficient. These techniques include, for example, 1) screen sharing in which applications can achieve synchronization by sending pixel-by-pixel representations of an application front-end as video at a rate of at least 30 times per second; 2) maintaining centralized persistence via a structure or master copy of the front-end application at a central server or other compute device while loaded instances of the application are synchronized, adding computational cost to the central server or compute device; and 3) implementing complex algorithmic solutions to avoid collisions when users collaborate in near real-time through several instances of the synchronized application, which imply the use of specific turn-based rules and user roles such as master and viewer.

The subject technology is related to methods and apparatus for a distributed shared memory for synchronization of applications in near real-time. The subject technology implements an event-based distributed shared memory to synchronize front-end applications with near real-time responsiveness or latency. Accordingly, multiple users can write, edit and/or manipulate objects displayed on the front-end application in a seamless manner. The subject technology is suitable for collaborative applications, gaming applications, media streaming applications, immersive systems, and other similar types of applications in which front-end application synchronization is desired.

In general, near-real time latency or responsiveness of front-end applications can be configured via event listeners strategically placed on segments of a distributed shared memory and/or by configuring a front-end synchronized application responsiveness clock as discussed throughout this disclosure. In some implementations, near real-time associated with the latency and/or responsiveness of a front-end application is configured according to the functionality of the application or system being supported by front-end synchronized applications. For example, applications providing Voice over IP (VoIP) can be supported by front-end synchronized applications with a near real-time latency or responsiveness in the range of about 13 ms to 100 ms. In such instances, an upper limit of about 100 ms is configured because exceeding such an upper limit can degrade conversation quality to a point it becomes difficult to humanly communicate.

In some implementations, near real-time responsiveness of a front-end synchronized application can be configured based on the average human reaction time, which is on the order of a quarter of a second, i.e., 250 ms. In some further implementations, for example, implementations configured to support collaborative applications, social media applications, and other suitable applications, near real-time responsiveness of front-end synchronized applications can be configured to operate in the range of about 100 ms to 250 ms. In yet some further implementations, for example, online games and other suitable interfaces can be supported in which near-real time responsiveness is lower than the average human reaction time; responsiveness of front-end synchronized applications can be configured to operate in the range of about 50 ms to 100 ms. An upper limit of about 100 ms can be used for online multiplayer games because players' performance tends to degrade when games responsiveness time is greater than 100 ms.

Some immersive systems or interfaces configured or dedicated to provide virtual life-like user experiences, including games and simulation systems can be supported by front-end synchronized applications configured to operate at a responsiveness time between about 13 ms and 50 ms. These applications can include, for example, massive multiplayer online gaming systems, virtual reality systems, simulators and other suitable applications.

While the discussed near real-time responsiveness times are described in the context of specific systems and/or applications, it will be appreciated that the concepts described hereinafter may be applicable to other suitable applications with different responsiveness and/or latency time requirements.

In some implementations, a front-end synchronization system initiates a peer-to-peer joint session of front-end synchronized applications. The joint session includes multiple instances of front-end synchronized applications. Each instance of the front-end synchronized application is operatively coupled to (or able to access) an instance of a distributed shared memory. Instances of the distributed shared memory are implemented at multiple compute devices coupled in a computer network. For example, each instance of the front-end synchronized application can be instantiated in a different compute device.

The front-end synchronization system is configured to receive an input signal at a first instance of the front-end synchronized application and store, based on the input signal, a value into a field data structure defined in the distributed shared memory. The field data structure is associated with a set of event sources. Each event source from the set of event sources is configured to generate an event object indicative of the new or modified value stored in the field data structure. The front-end synchronization system updates the instances of the front-end synchronized application in the joint session based on the event objects and the updated or modified value in the field data structure.

Advantageously, in some instances, the subject technology provides techniques for a multi-user application to operate without relying on a master copy representing the application front-end. As a result, in some instances, for example, compute devices running a multi-user application do not exchange communications with a central server having a master copy representing the state of the front-end application. Additionally, in some instances, users need not to be assigned with roles such as master and viewer and need not to defer to turn-taking protocols and complex collision avoidance techniques. In some instances of the distributed architecture of the subject technology, copies of shared data can be maintained by each participant compute device. Performance can be improved over centralized architectures by processing data locally before updating and/or distributing changes to other participant compute devices. Thus, the subject technology provides a lightweight solution for the synchronization of front-end applications.

The subject technology relies on multiple backend processes executed at near real-time. Specifically, in some instances, end-to-end synchronization delay introduced by compute devices implementing the subject technology processes and network transmissions is on a millisecond order, for example, between 150 ms and 500 ms. Thus, in some instances, synchronization of front-end applications can be perceived to be executed immediately as part of mechanical actions made by users. For example, changes made to a front-end application through user mechanical actions such as, dragging a graphical object, filling out a form field, clicking on a button, and other suitable user interactions, can be synchronized with multiple instances of a front-end application in near real-time.

In some instances, a front-end synchronization system discussed with reference to FIG. 1, implements multiple instances of a distributed shared memory residing across multiple compute devices, for example, compute devices 105, 107, and 109. The instances of the distributed shared memory are logically and operatively coupled via a computer network e.g., computer network 103. Instances of the distributed shared memory execute backend processes associated with a front-end synchronized application. Accordingly, each of the compute devices implementing the distributed shared memory instantiates a front-end synchronized application.

A front-end synchronized application includes multiple distributed instances of the front-end application represented as instances 111A, 111B, and 111C, instantiated respectively in compute devices 105, 107, and 109. The compute devices 105, 107, and 109 can be configured to receive inputs from users 117, 119, and 121 or signals from non-person entities to change the state or create a new state of the front-end synchronized application. In some instances, when such inputs or signals are received at an instance of the front-end synchronized application, for example, instance 111A implemented in local compute device 105, local compute device 105 inserts or updates a value in its local instance of the distributed shared memory. For example, a value stored in a field data structure can be updated or modified, or a new data structure can be created storing a new value in the local instance of a distributed shared memory upon receipt of an input from user 117 or signal from non-person entities. Such a field data structure can be configured as an event source by non-local instances of the distributed shared memory such that, whenever the field data structure and/or a value stored in the field data structure is updated, changed, or created, an event object is propagated to the non-local instances of the distributed shared memory causing the non-local instances of the front-end synchronized application 111B and 111C to reflect the new or modified state of the local front-end synchronized application.

The front-end application synchronization system can support multiple types of near real-time collaborative user interactions and near real-time reactive applications. Some examples of supported applications include multi-player games, collaborative production applications, whiteboard applications and other suitable applications enabling users to establish joint sessions to communicate and collaborate. Some examples of the supported user interactions include collaboratively writing/editing documents; viewing identical or matching screens or user interfaces on separate devices such that multiple viewers share the same user experience in near real-time (e.g., reviewing a presentation slide-by-slide, zooming to a particular detail and/or other suitable near real-time engagements); near real-time or turn-based multiplayer video games; synchronized audio/video streaming applications; geolocation applications; and/or other suitable applications.

Network 103 can include one or more types of communication networks. For example communication networks can include, for example, the Internet, a local area network (LAN), a wide area network (WAN), a metropolitan area network (MAN), various types of telephone networks (including, for example, Public Switch Telephone Network (PSTN) with Digital Subscriber Line (DSL) technology) or mobile networks (including for example Global System Mobile (GSM) communication, General Packet Radio Service (GPRS), Code Division Multiple Access (CDMA), and other suitable mobile network technologies.), or any combination thereof. Communication within the network can be realized through any suitable connection (including wired or wireless) and communication technology or standard (wireless fidelity (WiFi), 4G, long-term evolution (LTE), or other suitable standard).

Compute devices 105, 107, and 109 can be configured with one or more computer processors and a computer memory (including transitory computer memory and/or non-transitory computer memory), which are configured to perform various data processing operations. Examples of such devices can include a personal computer, portable computer, smartphone, tablet, notepad, dedicated server computer devices, any type of communication device, and/or other suitable compute devices. As described in further detail herein, in some instances, the compute devices 105, 107, and 109 can be connected to the network 103 via an intranet, an Internet Service Provider (ISP) and the Internet, a cellular network, and/or other suitable network communication technology. Components of the compute devices 105, 107 and 109 are discussed below with respect to FIG. 2.

In some instances, compute devices 105, 107, and 109 can be configured to implement synchronized multi-user, multi-display applications (hereinafter synchronized application). In some instances, the compute devices 105, 107, and 109 can have an integrated screen, for example a laptop screen, a smartphone screen and/or can be operatively coupled to a monitor or other suitable device to display front-end elements of the synchronized application. Accordingly, users 117, 119 and 121 can view instances of the front-end synchronized application 111A, 111B and 111C, respectively, at their corresponding compute devices.

Instances of the front-end synchronized application 111A, 111B, and 111C can be implemented using a hierarchical data structure (e.g., SHM 221 of FIG. 3) and provide a graphical front-end to a software system that accepts as input user-generated and system-generated events from a fixed set of events and produces deterministic graphical output. In some implementations, a front-end synchronized application 111A, 111B, and 111C contains graphical objects; each object has a fixed set of properties. At any time during the execution of front-end synchronized application 111A, 111B, and 111C, these properties have discrete values, the set of which constitutes the state of the front-end synchronized application 111A, 111B, and 111C.

The front-end synchronized application implemented in compute devices 105, 107 and 109 can update and synchronize front-end data across the devices connected to a joint session in near real-time. In some implementations, the compute devices 105, 107, and 109 can communicate with each other via data channels through a peer-to-peer (P2P) decentralized communication sessions (i.e., without a leader). For example, the compute device 105 can establish a data channel to communicate with the compute device 107 via a web browser supporting WebRTC protocol. For another example, a P2P data channel between the compute device 105 and compute device 107 can be established through WebTorrent or other suitable torrent client technology. In other instances, any other suitable P2P technology can be used to establish communication between the compute devices 105, 107 and 109.

In some alternative embodiments, the compute devices 105, 107 and 109 can use web sockets to establish a connection via the network 103 to a hub server 101. Accordingly, the compute devices 105, 107 and 109 can send messages to the server 101 and receive event-driven responses without having to poll the server 101 for a reply.

In some instances, users 117, 119 and 121 are equally privileged, equipotent participants of a joint session established via the front-end synchronized application. Accordingly, any of the users 117, 119 and 121 can make changes to an instance of the front-end application 111A, 111B and 111C, respectively, at any given time. Changes can be propagated among the compute devices 105, 107 and 109 through an event-based distributed shared memory (hereinafter SHM) and thus, the instances of the front-end application 111A, 111B and 111C can be updated and synchronized in near real-time. Further details regarding the SHM are discussed herein with respect to FIGS. 2-7.

Figure 2:
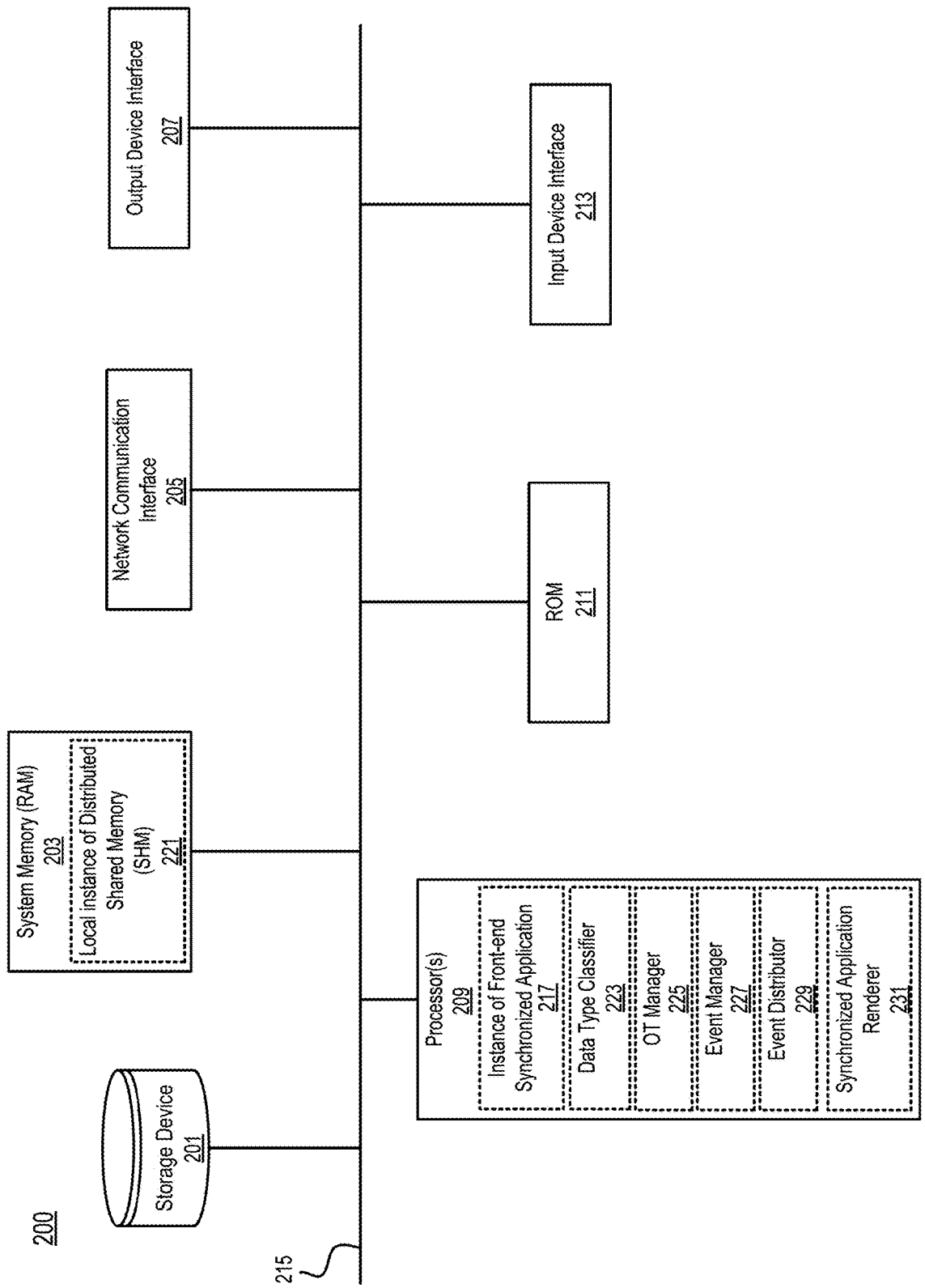
FIG. 2 is a schematic block diagram illustrating components of a client compute device that implements a front-end synchronized application, according to an embodiment.

FIG. 2 is a schematic block diagram illustrating components of a front-end application synchronization system client compute device, according to an embodiment. FIG. 2 conceptually illustrates each of the compute devices 105, 107 and 109 with which some implementations of the subject technology are implemented. The compute device 200 can be a computer, smartphone, tablet, notepad and/or any other suitable electronic device. Such a compute device 200 includes various types of processor-readable media and interfaces to operatively couple different types of processor-readable media. Compute device 200 includes a bus 215, a processor 209, a system memory 203, a read-only memory 211, a storage device 201, an input device interface 213, an output device interface 207, and a network communication interface 205.

The bus 215 collectively represents system, peripheral, and/or chipset buses that communicatively connect the numerous internal devices of the compute device 200. For instance, the bus 215 communicatively connects the processor 209 with the read-only memory 211, the system memory 203, and the storage device 201. From these various memory units, the processor 209 can retrieve instructions to execute and/or data to process to perform the processes of the subject technology. The processor 209 can be a single processor or a multi-core processor in different implementations. In some instances, the processor 209 can be any suitable processor such as, for example, a general purpose processor, a field programmable gate array (FPGA), an application specific integrated circuit (ASIC) and/or other suitable hardware devices.

The read-only memory (ROM) 211 stores static data and instructions that are used by the processor 209 and/or other modules of the compute device. The storage device 201 is a read-and-write memory device. This device is a non-volatile memory unit that stores instructions and data even when the compute device 200 is disconnected from power. In some implementations, a mass-storage device (for example a magnetic or optical disk and its corresponding disk drive) can be used as the storage device 201. Other implementations can use removable storage devices (for example a flash drive, or other suitable type of removable storage devices) as the storage device 201.

Similar to the storage device 201, the system memory 203 can be a read-and-write memory device. Unlike storage device 201, however, the system memory 203 is a volatile read-and-write memory, such as a random access memory. The system memory 203 stores some of the processor-executable instructions and data that the processor 209 uses at runtime including processor-executable instructions to instantiate and maintain the SHM 221. Alternatively, the SHM 221 or parts of the SHM can reside in the storage device 201. Accordingly, states and/or properties of an instance of the SHM 221 can prevail in non-volatile memory even when the compute device 200 is disconnected from power. Thus, in some implementations, the front-end synchronized application can be configured to automatically relaunch and synchronize (if required) when the compute device 200 is reconnected to power. In such a case the front-end synchronized application can be displayed according to the last state of the SHM stored in the storage device 201 and synchronization may be used for those elements of the front-end that have changed during the time the compute device 200 was turned off. This is an advantageous feature because instead of generating network traffic to synchronize all the elements of the front-end when the compute device is reconnected to power, only a subset of the elements may be synchronized and thus, in some instances some computational expense can be avoided. In some implementations, local instance of distributed shared memory 221 can be logically and operatively coupled to one or more of the instance of the front end synchronized application 217, data type classifier 223, OT manager 225, event manager 227, event distributor 229 and synchronized application renderer 231.

In some implementations, the executable instructions to run the processes of the front-end application synchronization system client compute device 200 can be stored in the system memory 203, permanent storage device 201, and/or the read-only memory 211. For example, the various memory units include instructions for providing an event-driven synchronized application including executable instructions to implement a front-end synchronized application 217, a data type classifier 223, an Operational Transformation (OT) manager 225, an event manager 227, an event distributor 229, and synchronized application renderer 231 in accordance with some implementations. For example, in some implementations, permanent storage device 201 can include processor executable instructions and/or code to cause processor 207 to instantiate a local instance of a front-end synchronized application 217 operatively coupled to a local instance of a distributed shared memory 221. Processor executable instructions can further cause processor 207 to receive an event object at local instance of distributed shared memory 221 from a non-local instance of the distributed shared memory (e.g., instantiated at another compute device and not shown in FIG. 2).

In some instances, the received event object can be generated at an event source in response to an input signal received from a non-local instance of the distributed shared memory, while in other instances the received event object can be generated at an event source configured in the local instance of the distributed shared memory 221. The processor 207 can further, determine, based on an event flow process, a field data structure defined at the local instance of distributed shared memory 221 and update a value stored in the field data structure. This can cause the local instance of front-end synchronized application 217 to match or mirror a state of the non-local instance of the front-end synchronized application. Further details regarding the event flow are discussed with reference to FIG. 3.

In some implementations, the components 217, 223, 225, 227 and 229 can be implemented in a general purpose and/or specialized processor (e.g., processor 209 configured to optimize the tasks performed by these components). In other implementations, the components shown in the processor 209 can be implemented as a combination of hardware and software. For example, the storage device 201 (or other suitable memory in the compute device 200) can include processor-executable instructions to instantiate the distributed share memory 221 and configure the processor 209 to execute the tasks performed by the components 217, 223, 225, 227 and 229. Accordingly, in some instances, the processor 209 retrieves data to process and instructions to execute various processes from one or more of the memory units shown in FIG. 2. For example, in some implementations, processor 209 is configured to send signals received from the local instance of a front-end synchronized application 217 to a non-local instance of the front-end synchronized application in near real-time via the distributed shared memory 221, such that the non-local instance of the front-end synchronized application (e.g., executed at another compute device not shown in FIG. 2) and the local instance of the front-end synchronized application 217 have corresponding or identical states.

The bus 215 also connects to the input device interface 213 and output device interface 207. The input device interface 213 enables users to communicate information and select commands at the compute device 200. For example, the input device interface 213 allows a user to interact with the front-end synchronized application 217. Input devices used with input device interface 213 can include, for example, alphanumeric keyboards, touch screens, pointing devices (also called "cursor control devices"), audio input devices (e.g., microphones), image capture devices (e.g., cameras) and/or other suitable input devices to interact with the front-end synchronized application 217.

Output device interface 207 enables, for example, the display of a front-end of the instance of front-end synchronized application 217. Output devices used with output device interface 207 can include, for example, printers, audio devices (e.g., speakers), haptic output devices, and display devices (e.g., cathode ray tubes (CRT), liquid crystal displays (LCD), gas plasma displays, touch screen monitors, capacitive touchscreen and/or other suitable display device). Some implementations include devices that function as both input and output devices (e.g., a touchscreen display).

As shown in FIG. 2, bus 215 can also couple compute device 200 to the network 103 (shown in FIG. 1) through a network communication interface 205. In this manner, the compute device 200 can be part of a network of computers (for example a local area network ("LAN"), a wide area network ("WAN"), or an Intranet, or a network of networks, for example the Internet. Any or all components of compute device 200 can be used in conjunction with the subject technology.

In some implementations, the data type classifier 223 can be configured to classify and/or identify a type of a value for a node. For example, the data type classifier 223 can be configured to classify a value for a node as a number, string, array, object and/or other suitable type. The OT manager 225 can be configured to consolidate multiple operations into a single operation accumulated over a predetermined interval of time, as described in further detail herein.

In some implementations, the SHM Event manager 227 can implement one or more event flow techniques (e.g., bubbling and/or event capture) and additionally implement the strategic placement of event listeners on one or more nodes, as described with reference to FIG. 3. The SHM Event distributor 229 can manage connectivity and network tasks, including the establishment of network connections with other instances of the SHM, request retransmission of data when desirable, sign data packages to verify that the data packages include valid changes generated by the front-end synchronized application and/or other network functions such as testing for latency issues. In some instances, the front-end synchronized application renderer 231 can be configured to update a shared display associated with the front-end synchronized application 217 based on changes identified by event listeners, as described herein.

Figure 3:
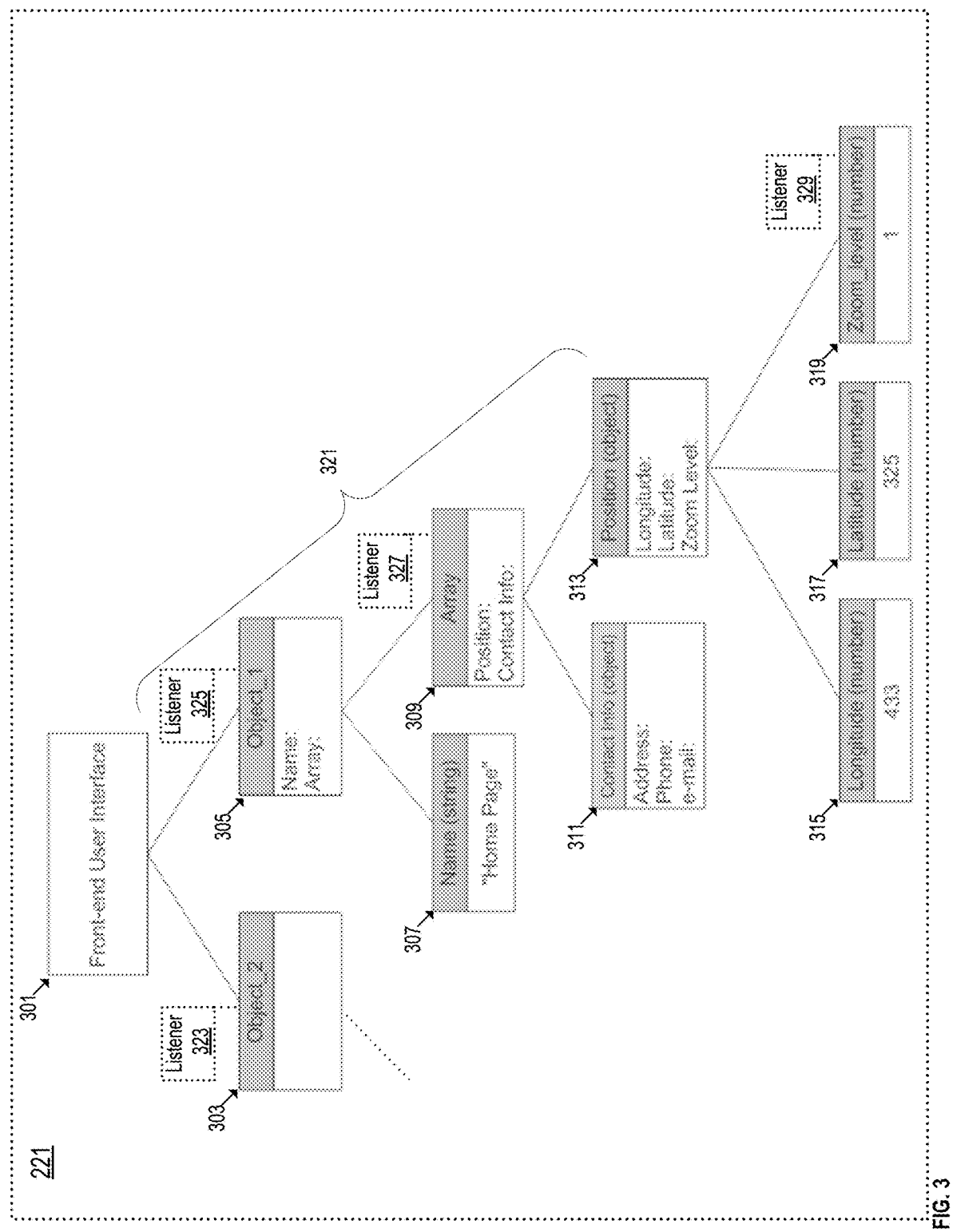
FIG. 3 is a diagram of a tree structure representing elements, paths, and parameters stored in an instance of a distributed shared memory, according to an embodiment.

FIG. 3 is diagram of a tree structure representing elements, paths, and parameters in an instance of the distributed shared memory, according to an embodiment. Properties of an instance of a front-end synchronized application (e.g., an instance of front-end synchronized application 217 discussed with reference to FIG. 2) including graphical and textual elements can be associated with the nodes of the tree structure shown in FIG. 3. In some implementations, each instance of the front-end synchronized application can have a corresponding tree structure logically defined in its SHM. For example the tree in FIG. 3 can be logically defined in SHM 221 implemented in a physical memory of the compute device 105 shown in FIG. 1.

Such a tree structure can be implemented, for example, based on JavaScript Object Notation (JSON) objects or other suitable technology. The tree in FIG. 3 shows a hierarchy of data structures used by the front-end synchronized application including parameters and paths allowed to be set, changed and/or monitored by compute devices implementing instances of the front-end synchronized application. In some instances, when the front-end synchronized application is launched by a client compute device, the tree can contain one or more nodes with empty values that upon initialization and further user interactions are set to specific values. Examples of user interactions with the front-end synchronized application include interactions to the front-end of the application via a mouse, keyboard, touchscreen and/or other suitable peripherals. Instances of the front-end synchronized application can also synchronize their front-ends upon conditions that are user and/or device independent such as changing the focus from one message to another or notifications based on timing conditions.

Nodes in the tree structure are associated with elements displayed on the instances of the front-end synchronized application include, for example, graphical objects, text, widgets (such as a clickable button) and/or other suitable elements or objects. In some implementations, each node in the tree structure is uniquely associated with a field data structure configured to store alphanumeric or other suitable values associated with properties of elements displayed on the instances of the front-end synchronized application. The root node 301 represents an object associated with the front-end of the front-end synchronized application. The root node 301 has numerous children nodes, for example "Object_2" at 303, and "Object_1" at 305. Each object can contain other objects, structures and/or primitive values logically defined as children nodes. For example "Object_1" at 305 includes a "Name" string data type at 307 with a string value "Home Page". Likewise, "Object_1" at 305 includes an array structure at 309. The array structure of 309 can contain objects, arrays, primitive datatype values or other suitable values also logically defined as children nodes. In the example shown in FIG. 3, the array structure at 309 includes a contact information object at 311 and a position object at 313. The position object at 313 further includes three leaf nodes, longitude at 315, latitude at 317, and zoom-level at 319. Each leaf node in this example has a numeric primitive datatype.

Paths can be logically defined as a sequence of edges, which connect a sequence of nodes distinct from each other. For example, the path 321 can be identified as the path from the root node 301 (i.e., Front-end User Interface) to the node 313 (i.e., position object). In the example shown in FIG. 3, the root node 301 has a path to every node (intermediate node or leaf node) in the tree structure.

Instances of the front-end synchronized application can register event listeners (also referred to as listener objects) with nodes in the tree structure shown in FIG. 3. For example, the event listeners 323, 325, 327 and 329 are registered, respectively, with nodes 303, 305, 309 and 319. The event listeners shown in FIG. 3 are examples of event listeners that can be registered by any instance of the front-end synchronized application. In some implementations, different instances of the front-end synchronized application in a joint session, register the same event listeners. In some alternative implementations, different instances of the front-end synchronized application in a joint session, register different number and/or types of event listeners. Variations in the event listeners registered among instances of the front-end synchronized application can depend, for example, on users' preferences, computational power of a compute device hosting an instance of the front-end synchronized application, and/or other suitable criteria.

In general, once an event listener is registered with a node, such a node becomes an event source for the event listener. Nodes that become event sources fire and/or initiate event objects when certain conditions are met. For example, a change to a value contained in an event source node can fire and/or initiate an event object with data indicating the change. Event listeners have corresponding methods and/or functions that specify what will happen when an event object is fired and/or initiated by their event sources. Such methods or functions are called event handlers or callback functions (hereinafter callback functions).

For example, when a first user for instance, user 117 in FIG. 1, changes the "zoom level" of the front-end application 111 also shown in FIG. 1, the new value for the "zoom level" is updated in the SHM 221. Specifically, a change is made to the value in the node 319. As discussed above, node 319 is an event source for the event listener 329. In this case, the event listener 329 was registered with the node 319 by an instance of the front-end synchronized application launched by a second user (e.g., user 119 in FIG. 1). Accordingly, the event listener 329 will identify the change made by the first user to the node 319 and will execute its callback function in response to the triggered event object. The execution of the callback function of the event listener 329 is configured to update the "zoom level" value of the SHM of the instance of the front-end synchronized application running at the compute device 107 shown in FIG. 1. Thus, the front-end viewed by the second user (i.e., the instance of front-end synchronized application 111B) replicates the changes made by the first user. Further details about the synchronization process are discussed herein with respect to FIGS. 4-7.

In some instances, when a user, for example user 117, 119 or 121 in FIG. 1, makes a change or update to an instance of a distributed shared memory by interacting with an instance of the front-end synchronized application, an indication of such a change or update can be propagated throughout the nodes of the tree via one or more event flow techniques. In a bubbling event flow, when a change is executed on a child node, an indication of the executed change can be propagated to parent or ancestor nodes of the targeted child node. For example, an indication of a change to a value stored in field data structure implemented in latitude node 317 (e.g., an integer number stored in node 317) can be propagated to the array node 309 via a path including the position node 313 (also referred herein to the position object). In such a case, the array node 309, which is an event source for the event listener 327, generates an event object detected by the event listener 327 and thereafter one or more callback functions are executed at a first time.

As described above, the one or more callback functions can synchronize instances of the distributed SHM operatively coupled to instances of the front-end synchronized applications. In this example, instances of the front-end synchronized application that had registered the event listener 327 or other analogous event listeners with the array node 309 are synchronized and thus, such instances of the front-end synchronized application display the change made to the latitude node 317. Moreover, indication of executed change, in this case, changes executed over targeted node 317 can be propagated to other ancestor nodes different from ancestor node 309 having registered their own event listeners generating further event objects. For example, as discussed above, an indication of a change to the latitude node 317 can be propagated to array node 309 and additionally the indication can be propagated to the "Object_1" node 305, which is an event source for the event listener 325, resulting in the execution of the callback function of the event listener 325 at a second time later than the execution of the callback function of the event listener 327.

Event capture is another example of an event flow technique that can be implemented by the front-end synchronized application. For instance, when a user makes a change to an instance of the distributed shared memory by interacting with an instance of the front-end synchronized application targeting a parent node or ancestor node (e.g., "Array" node 309), an indication of the executed change can be distributed to children or descendent nodes of the targeted node 309. Accordingly an indication of the executed change can be propagated to "Contact Info" node 311, "Position" node 313, "Longitude" node 315, "latitude node: 317, and "Zoom level" node 319. In some instances, event listener 327 and its corresponding callback function execute at a first time and event listeners registered with children or descendent nodes of the array node 309 and their respective callback functions execute at a second time. For example, a callback function associated with event listener 329 registered with "zoom level" node 319, can execute at a second time later than the first time upon reception of an indication of a change made to targeted "Array" node 309.

The number of nodes and the complexity of the tree structure shown in FIG. 3 can be arbitrary and in some instances the tree structure can grow over time and/or depending on the type of front-end synchronized application implemented. Accordingly, the front-end synchronized application can strategically register event listeners with one or more new or preexisting nodes such that, the event flow and distribution among the different instances of the front-end synchronized application is performed in near real-time. For example, as discussed above, event sources generate event objects upon changes in the tree structure, and thereafter, one or more event listeners and callback functions are execute. Using FIG. 3 as an example, the closer event listeners are to a targeted node being changed or updated, the faster the event sources can generate event objects detected by event listeners with callback functions configured to synchronize other instances of the front-end synchronized application. Thus, in some instances, the front-end synchronized application can configure event listeners at specific nodes when it is determined that end-to-end synchronization takes more than a predetermined time threshold.

The threshold can indicate a time limit for which users' perceptions of real-time interactivity experience with the front-end synchronized application is negatively affected or degraded. For example, optimal performance in some video games can be achieved when latency or responsiveness of a video game is constrained within the range of about 50 ms to 100 ms, (however, as discussed above, other applications can tolerate or require different latency or responsiveness times). Accordingly, in some instances, the tree structure can be logically divided by the strategic placement of event listeners such that end-to-end synchronization is kept under the predetermined time threshold. For example, event listeners can be strategically placed on nodes to cause an event flow to correspond to an event flow performed over an emulated balanced tree, that is, self-balancing algorithms (e.g., used to analyze an amount of latency that occurs after a change to specific nodes have been made, as described herein) can be implemented to place the event listeners in a subset of nodes such that the end-to-end synchronization is kept below a time threshold. Accordingly, even when a tree structure is an unbalanced tree, the strategic placement of event listeners can result in event flows propagating changes throughout subtrees with the same or substantially the same number of nodes and thus, end-to-end synchronization can be kept under the predetermined time threshold.

In some instances, the front-end synchronized application can detect when a node is being targeted and updated more often than other nodes, and may be close to reach a latency time threshold. Accordingly, the front-end synchronized application (or a specific instance of the synchronized application) can configure an event listener in such a targeted node to prevent latency issues affecting users' experiences.

In some instances, the number and location of event listeners implemented by each compute device to monitor the nodes of an instance of the tree implemented at the other compute devices can vary based on a frequency of update of a parameter by that compute device, the interest the initiating compute device has in changes to a particular parameter, and/or the like. For example, compute device 105 can implement an event listener to the position node in the instance of the distributed shared memory at compute device 107, but not compute device 109. In this example, compute device 105 may have observed that compute device 107 often makes changes to the position node values, but compute device 109 rarely makes changes to the position node values. Thus, an event listener initiated by compute device 105 at the object_1 node in the tree at compute device 109 (rather than a specific event listener on the position node values) would be sufficient to synchronize the infrequent changes the compute device 109 makes to the position node values.

Moreover, in some instances, different compute devices can initiate different event listeners on the other compute devices. For example, while compute device 107 implements an event listener on the position nodes of the tree of compute device 105, compute device 109 may not initiate an event listener on the position nodes of the tree of compute device 105. In such an example, identifying near real-time changes to the position nodes of the tree of compute device 105 can be more important to compute device 107 than to compute device 109. Accordingly, each compute device 105, 107, 109 (or their associated users 117, 119, 121) can determine the event listeners to initiate (and which variables to monitor) on the other compute devices implementing the distributed shared memory on a device-by-device basis. Accordingly, the desire for near real-time synchronization can be balanced with the computing and networking costs associated with implementing a large number of listeners. While the distributed shared memory is described as an implementation of a tree data structure, it will be appreciated that the described concepts are applicable to other data structures including, databases, graphs, file systems and/or other suitable data structures.

Figure 4:
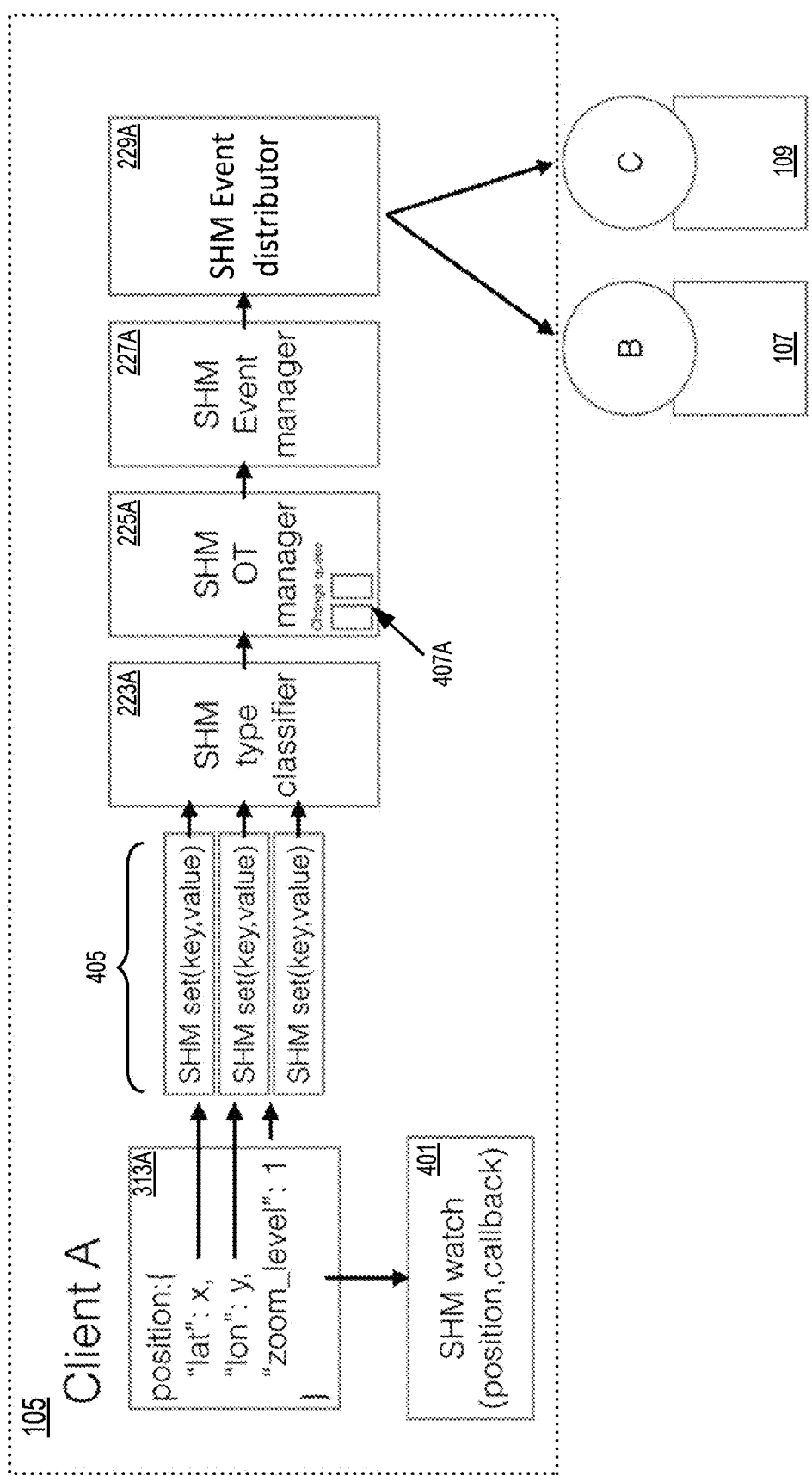
FIG. 4 is a schematic block diagram illustrating an example of a front-end synchronized application synchronization process from the perspective of a compute device generating a synchronization event object, according to an embodiment.
Figure 5:
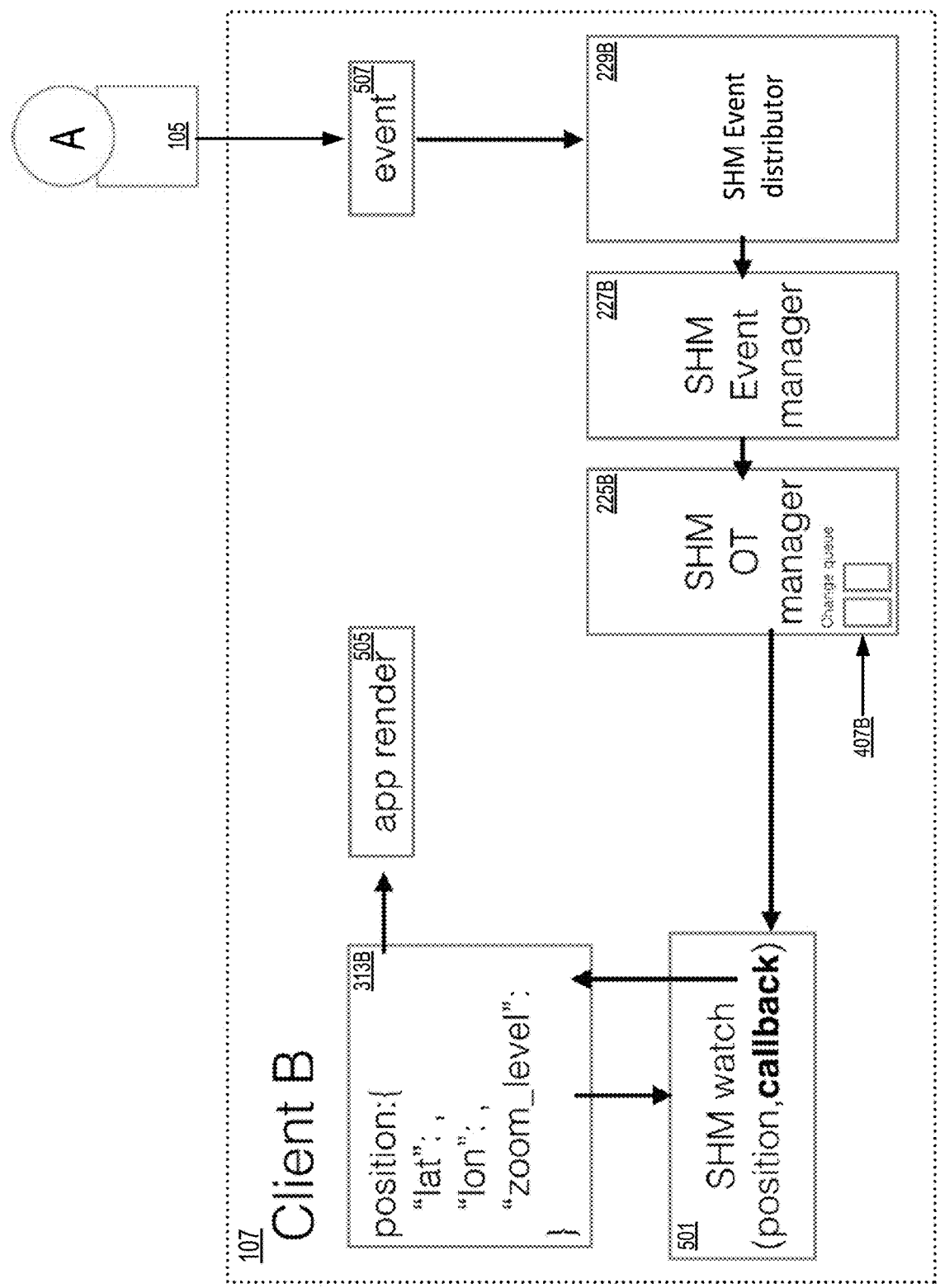
FIG. 5 is a schematic block diagram illustrating an example of a front-end synchronized application synchronization process from the perspective of a compute device receiving a synchronization event object, according to an embodiment.

FIG. 4 and FIG. 5 describe examples of processes executed by compute devices implementing instances of the distributed shared memory. The examples described with reference to FIG. 4 discuss propagation of changes made to a local instance of the distributed shared memory executed upon the reception of signals generated at a local instance of the front-end synchronized application. The examples described with reference to FIG. 5 discuss propagation of changes made to a local instance of the distributed shared memory executed upon the reception of signals generated at a non-local instance of the distributed shared memory.

FIG. 4 is a schematic block diagram illustrating an example of front-end synchronized application synchronization process from the perspective of a compute device generating a synchronization event object, according to an embodiment. In some implementations, a local compute device (such as local compute device 105 of FIG. 1), instantiates a local instance of a front-end synchronized application logically coupled to a local instance of a distributed shared memory. The distributed shared memory is implemented across multiple compute devices operatively coupled through a computer network and includes the local instance and a set of non-local instances. The compute device receives, at the local instance of the front-end synchronized application, an input signal to change a state of the local instance of the front-end synchronized application.

The local compute device determines, based on the input signal, a value associated with a field data structure defined in the local instance of the distributed shared memory. In some instances, the compute device aggregates the determined value with other recently changed and/or updated values and stores the aggregated result in a consolidated operation data structure, for example, change queue 407A.

The consolidated operation data structure is used by operational transformation (OT) manager 225A and can be implemented throughout and/or by one or more instances of the distributed shared memory. The consolidated operation data structure defines a storage structure (e.g., memory segments in a local compute device), field data structures and values associated with one or more node elements shown with reference to FIG. 3 and/or other suitable data structures defined by the distributed shared memory.

In some instances, the consolidated operation data structure includes multiple aggregated values associated with multiple field data structures defined by the local instance of the distributed shared memory. For example, when the consolidated operation data structure is implemented as a queue (e.g., change queue 407A), each item in the queue temperately stores aggregated values associated with field data structures defined in the local instance of the distributed shared memory implemented in compute device (e.g., local compute device 105). Values in change queue 407A can be aggregated through, for example, a summation of discrete values associated when the changes target a same field data structure. In some instances, values temporarily stored in the consolidated operation data structure can correspond to the summation of values associated with field data structures during a predefined time interval. Other values defined in the consolidated operation data structure can correspond to a new or updated value associated with a field data structure during the predefined time interval, for example, when the value is represented as a string or textual value as opposed to a numerical value.

In some instances, the predefined time interval can be implemented at an OT manager (e.g., OT manager 225A in FIG. 4), through a responsiveness clock. The time interval can be configured according to responsiveness or latency requirements of the system being supported by the front-end synchronized application. As previously discussed, responsiveness requirements can vary, for example, near real-time responsiveness can be between about 13 ms and 250 ms depending of the functionality of the system.

In some instances, the time interval of an OT manager responsiveness clock can be reconfigured upon detection of emergent properties associated with network transmission. For example, network 103 of FIG. 1 can be modified to enable a new and/or optimized transmission time between compute device 105 and 107. Accordingly instances of front-end synchronized application can determine when a new transmission time is feasible and reliable by monitoring end-to-end communication times over time. Accordingly, instances of the front-end synchronized application can reconfigure their responsiveness clock to reset their time at a different time interval. For example, if at a first time, end-to-end transmission time between compute device 105 and compute device 107 is only permissible or feasible at a transmission time of 100 ms, a local instance of a front-end synchronized application can configure its responsiveness clock to reset at a time interval of 100 ms or other suitable time interval based on the determined transmission speed. If, however, such an instance of a front-end synchronized application determines, at a second time, that end-to-end transmission time has changed and is stable, the instance of the front-end synchronized application can reconfigure its responsiveness clock to reset at a new time interval (e.g., every 50 ms instead of every 100 ms).

In some instances, an instance of a front-end synchronized application can execute one or more reliability or stability tests before reconfiguring its associated responsiveness clock. For example, by monitoring how stable end-to-end transmission times are over a time interval greater than the time interval on which the responsiveness clock operates or other suitable time interval.

The local compute device (e.g., local compute device 105) is configured to insert a set of aggregated values stored in the consolidated operation data structure (in this case change queue 407A) into a set of field data structures defined in the local instance of the distributed shared memory, upon a determination that a time dependent threshold has been reached. In some instances, the time dependent threshold is logically associated with the time interval configured in the responsiveness clock. Thus, when the responsiveness clock resets its time, for example, resets time to zero every 50 ms, the aggregated values in the consolidated operation data structure are dumped or inserted into the local instance of the distributed shared memory.

In some implementations, the local instance of the distributed shared memory generates one or more event objects indicative of the set of aggregated values inserted into the set of field data structures defined in the local instance of the distributed shared memory. Non-local instances of the distributed shared memory are implemented in, for example, other compute devices that are not local compute device 105 and are operatively coupled to network 103 in FIG. 1, including compute device 107 and compute device 109 also shown in FIG. 1. Accordingly, the local instance of the distributed shared memory sends the one or more event objects to non-local compute devices to update one or more non-local instances of the front-end synchronized application such that the states of the non-local instances of the front-end synchronized application match the state of the local instance of the front-end synchronized application. Further details regarding configuration of event sources and event objects on distributed shared memory are provided below with reference to FIGS. 4 and 5.

In some instances, each user of the front-end synchronized application (e.g., users 117, 119 and 121 in FIG. 1) can launch an instance of a front-end synchronized application on their compute device (respectively 105, 107 and 109 in FIG. 1). As a result, each compute device 105, 107 and 109 initializes an instance of the distributed shared memory (hereinafter SHM) as part of a joint session of the front-end synchronized application. Each front-end application can include a Graphical User Interface (GUI) with graphical elements that are to be synchronized by the front-end synchronized application, by updating one or more objects, structures and/or values stored in a distributed shared memory (SHM) (e.g., distributed shared memory 221 in FIG. 2), to reflect changes to the properties of graphical elements in the GUI of the instantiated front-end applications.

The SHM Watch 401 (shown in FIG. 4) is an example of an event listener registered with the position node 313A (shown in FIG. 3). Thus, client compute device 105 is "subscribed" to a "feed" of changes made to the position node 313A. Differently stated, the position node 313A becomes an event source for the event listener SHM Watch 401. In this example, the position parameter in the SHM Watch 401 corresponds to the path 321 shown in FIG. 3, which is the logical path to the position node 313A. Accordingly, changes to the position node (in this example) are noticed by the registered event listener 401 because the position node is now an event source that will trigger an event object when changes are made to, for example, any of the fields latitude ("lat"), longitude ("ion"), and/or "zoom level".

The compute device performing the initial launch of the application (e.g., compute device 105 in FIG. 4) can write in its local instance of the SHM the initial state of the front-end synchronized application. For example, the compute device 105 can initialize a front-end showing a digital map. Such a digital map may be configured to display a location established through the position node 313A. The position node 313A includes the fields latitude, longitude and zoom level as shown in the data structure below:

position: {
"lat": xxxxx,
"long": xxxxx,
"zoom level": 1
}

Accordingly, the compute device 105 can set the values of the three fields ("lat", "lon" and "zoom level") in its local instance of the SHM as shown at 405. Thereafter, one or more event listeners registered with the event source position node 313A will identify an event object. For example, compute devices 107 and 109 can similarly register event listeners corresponding to the SHM Watch 401. Thus, compute devices 107 and 109 via their event listeners can identify event objects generated upon a change to the event source position 313A. The SHM Watch function or other suitable event listener can be registered by instances of the front-end synchronized applications launched in the compute devices 107, and 109 once for each path that an instance of the front-end synchronized application would like to monitor. For example, compute device 107 can register three SHM Watch event listeners with the position node to monitor changes to each of the "lat", "long" and "zoom_level" fields each field registered with a separate event listener. Thus, incrementing the level of specificity when a change occurs to the position object 313A. Alternatively, compute device 107 can register one SHM Watch event listener with the position node. In such a case, the compute device 107 receives a single event object upon changes to any of the "lat", "long", or "zoom_level" fields, reducing computational costs related to event flow transmission. Further details regarding the event object signal are discussed herein with respect to FIG. 5.

Once a value is set in an instance of the SHM, the synchronization system determines its type at 223A (for example, Number, String, Array, Object and/or other suitable type). In some instances, changes to the front-end synchronized application can be consolidated prior to distribution to other compute devices. Such a consolidation can be performed by using an operational transformation (OT) method implemented by the SHM OT manager 225A. Accordingly, the front-end synchronized application can define an operation or a single multi-operation for each change or burst of changes received for one or more nodes and/or values associated with the front-end application. A burst of changes (e.g., a number of changes within a given time period) can be reduced to a single operation before distribution. After a predetermined time period (e.g., at intervals of 25 ms, 50 ms, 100 ms, and/or 150 ms), accumulated changes can be aggregated in a consolidated operation data structure and distributed. For example, if compute device 105 sets "lat" to value 'a', "lon" to value 'b', and "zoom_level" to value 'c' within a predefined time period, a new change event object can be generated (i.e., set 'abc' into position object fields "lat", "lon" and "zoom_level") equivalent to the burst. The event object can be then distributed to the other client compute devices that have registered a corresponding SHM WATCH event listener with the position object. For another example, if client compute device rapidly sets the position field "zoom_level" from value 'x' to value "x−2" and then, value "x+7" within a predefined time period, the changes to "zoom_level" can be consolidated in a new change event defined as "zoom_level"="x+5" thus, some computational overhead can be minimized or reduced by such a consolidation operation. This type of minimization of computational overhead is possible because event objects are not distributed for every single change to the "zoom_level" just for those changes that are needed to keep a user experience in near real-time.

FIG. 5 is a schematic block diagram illustrating a front-end application synchronization example from the perspective of compute device 107 receiving a synchronization event object 507, according to an embodiment. As shown in FIG. 5, the compute device 107 can receive an event object 507 triggered by a change made to the position object on another compute device (e.g., compute device 105). In some implementations, the received event object 507 can contain a copy of an old value (e.g., positionlat='y'), a new value (e.g., position.lat='y+5') and/or a differential from old value to new value (e.g., diff='5'). Each SHM Watch event listener identifies a specified path to the parameter to be synchronized and/or monitored, and a callback function that is executed in response to a change in the registered object. Thus, for example, a path to the SHM portion storing the position object to be monitored can be defined as a parameter when compute device 107 registers the SHM Watch event listener 501. Accordingly, the SHM path (in this case a pointer to node element "position") specified in SHM Watch event listener 501 allows the compute device 107 to receive an event object (e.g., event object 507) when other compute devices (e.g., compute device 105) participating in a joint session of the front-end synchronized application make changes to the event source specified in the path (e.g., position node).

The SHM Event distribution 229B receives the event object 507 generated at an instance of the distributed shared memory implemented in compute device 105, and sends an event indicator to the SHM Event manager 227B. The SHM Event manager 227B executes an event flow process as discussed with reference to FIG. 3, and in some instances, identifies one or more event listeners configured to detect and/or process the event object 507.

SHM Event manager 227B forwards instructions to the SHM OT manager 225B to append or aggregate changes received at the instance of the distributed shared memory implemented in compute device 107. The received changes are associated with changes to values stored in one or more field data structures defined in the instance of the shared memory implemented in compute device 107.

As discussed above, when the consolidated operation data structure is implemented as a queue, in this case, change queue 407B, each item in the queue temporarily stores aggregated values associated with field data structures defined in the local instance of the distributed shared memory implemented in compute device 105. In this case the received changes are originated in a non-local instance of the distributed shared memory (i.e., an instance implemented at compute device 105) as opposed to changes received from a local instance of front-end synchronized application as discussed with reference to FIG. 4. Thus, SHM OT manager 225B can consolidate multiple change operations into single operation based on the content accumulated in change queue 407B.

The conversion from multiple operations to a single operation can be performed at a predetermined time (e.g., at time intervals of 25 ms, 50 ms, 100 ms, 150 ms or other suitable time interval) such that front-end application implemented in compute device 107 displays changes in near real-time. Thereafter, the callback function specified in the SHM Watch event listener 501 and/or other event listener configured to notice the event object 507 can be executed at the compute device 107. In this case, the callback function in 501 is configured to change one or more fields of the position object 313B in its instance of the SHM. Thereafter, the callback function can initiate a process 505 to render or re-render the front-end synchronized application of compute device 107 such that the changes made to the position object 313B are displayed in the local display device coupled to the compute device 107. Accordingly, per the above described process, after a compute device receives an event object or an indication of changes to an element of the front-end synchronized application, the synchronization application on such a compute device processes the change on its local instance of the SHM and makes any required updates and/or changes to its local instance of the front-end synchronized application.

As discussed above, the synchronization system is independent of a distribution method. Accordingly, the distribution of data can be executed by, for example, Peer-to-Peer (P2P) distribution with WebRTC DataChannels; P2P distribution with WebTorrent; Hub based distribution with websockets and/or other suitable distribution methods; and/or other suitable methods.

In some alternative implementations, one or more of the instances of the synchronization can be configured to register SHM WATCH ONLY event listeners (i.e., "spectator mode for the SHM") for some users and/or compute devices. In this mode, the front-end synchronized application can be configured to allow a subset of users and/or compute devices to use the SHM SET operation and therefore only those users and/or compute devices will be able to change a parameter or objects stored in the SHM shown in FIG. 3. Accordingly, the SHM WATCH ONLY event listeners can be used to configure different users' roles (e.g., spectators and participants). Thus, an additional mode, i.e., WATCH ONLY mode, can be used to configure permissions at the parameter and/or object level. Thus, complex users' roles and turn-based interactions can be implemented in a distributed manner. For example, a client compute device in a gaming front-end application can be set to be in WATCH ONLY mode when it is not that client compute device's turn to make a move.

Conflict resolution in event operations (i.e., among event objects) can be handled by the front-end synchronized application by the implementation of one or more policies. For example, a conflict resolution policy can specify to perform changes at an instance of the front-end synchronized application based on the first event object received at the local instance of the SHM event distributor. For another example, a conflict resolution policy can specify the compensation or regulation of the arrival time of event objects generated at specific compute devices. For instance, the policy can allow for compensating or prioritization of event objects generated at compute devices that are below an average latency shown by the overall compute devices participating in a joint session of the front-end synchronized application. Thus, a conflict resolution policy can be set to provide an equal opportunity to participants. Such a compensated event object arrival time can be calculated based on the accumulated perceived average Round Time Trip (RTT) of every participant compute device. For yet another example, a conflict resolution policy can specify an automatic conflict resolution based on data types, for examples event objects indicating changes to numbers would be prioritized over event objects indicating changes to arrays or other object types. Other suitable policies can be implemented including, but not limited to, the prioritization of event objects specifying a single operation derived from the OT transformation of multiple operations and/or any combination of the aforementioned policies.

Figure 6:
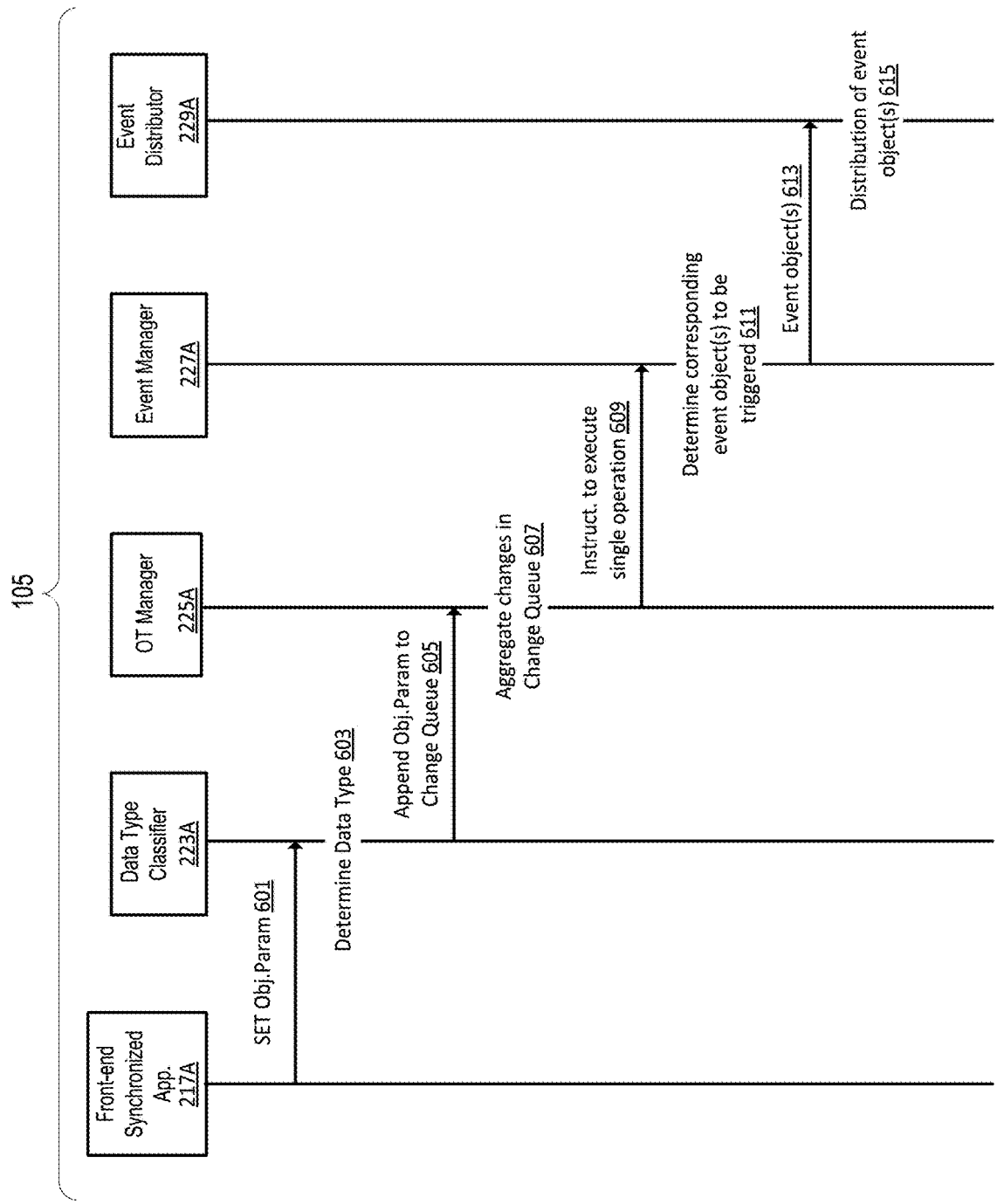
FIG. 6 is a signal flow diagram for the distribution of an indication of a change to a front-end synchronized application among participant client compute devices in a joint session of the front-end synchronized application, according to an embodiment.

FIG. 6 is a signal flow diagram for the distribution of a change to a front-end application among participant client compute devices of a joint session of the front-end synchronized application, according to an embodiment. In some implementations, an instance of the front-end synchronized application 217A in a compute device (e.g., compute device 105) sends a SET Object.Parameter message to the data type classifier 223A, at 601. The SET Object.Parameter message can be generated, for example, because a user of the front-end synchronized application 217A has changed the zoom_level of the front-end synchronized application. Accordingly, the SET instruction in such an instance can be a change to the zoom_level field of the position object shown in, for example, FIG. 3. The data type classifier 223A can determine the data type, at 603. For example, the zoom_level can be a numeric data type, however, other data types (e.g., strings, arrays, objects, etc.) can be equally handled by the front-end synchronized application. Thereafter, the data type classifier 223A can send a message to append Object.Parameter to Change Queue message to the OT manager 225A, at 605. As discussed above, the OT manager can consolidate multiple operations into a single operation accumulated over a predetermined interval of time, at 607. Thus, in some instances, the OT manager 225A can send instructions to execute a single operation corresponding to one or more aggregated changes to the event manager 227A, at 609.

In some instances, the event manager 227A can identify, at 611, one or more event objects that will be triggered as a result of the single operation received at 609. For example, one or more event objects configured to be triggered upon a change to any of the fields of the position object and/or an event object configured to be triggered upon a change specific to Position.zoom_level. As previously discussed, the configuration of the event objects can be made by one or more of the participant compute devices of a joint session of the front-end synchronized application by registering event listeners with the position object and/or the "zoom_level" field. Indicators or identifiers of the event object(s) are then sent, at 613, to the event distributor 229A for their distribution, at 615, to other participant compute devices in the joint session of the front-end synchronized application that have registered a event listener for the change made to the Position.zoom_level field.

Figure 7:
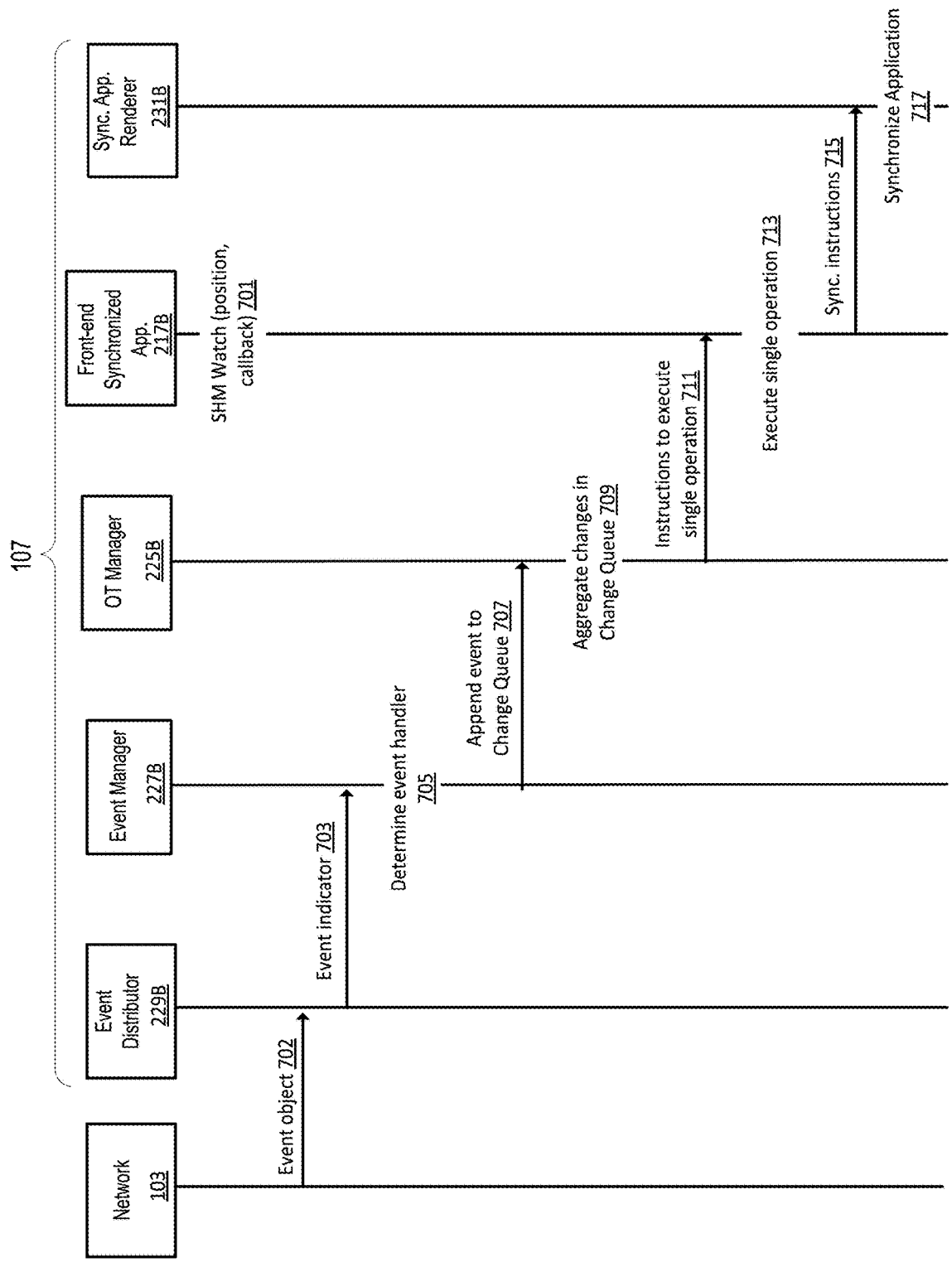
FIG. 7 is a signal flow diagram for implementing a change at a front-end synchronized application in a joint session of the synchronized application, according to an embodiment.

FIG. 7 is a signal flow diagram for the rendering of a change to a front-end application that originated at a participant compute device of a joint session of the front-end synchronized application, according to an embodiment. In some implementations, a participant compute device (e.g., compute device 107 shown in FIG. 5) of a joint session of the front-end synchronized application can register an event listener with the position object, at 701. Accordingly, in this example, whenever the position object (or any field within the position object) is changed by, for instance, another participant compute device of the joint session (e.g., compute device 105 shown in FIG. 4), the compute device 107 receives at its local instance of the event distributor 229B an event object, at 702. As discussed above, the event object can include an identifier of the front-end element that has been changed (e.g., in some instances the identifier can be the path), an old value for the front-end element, the new value for the front-end element and/or a differential from the old to the new value. The event object can be sent in response to the receiving compute device implementing a listener function to that front-end element in an instance of the distributed shared memory at the sending compute device.

The event distributor 229B can then send an event indicator to the event manager 227B, at 703. Thereafter, the event manager 227B can determine, at 705, an event handler for the event indicator received at 703. The event manager 227B sends a message to append the event object to a change queue to the OT manager 225B, at 707. As discussed above, the OT manager 225B can consolidate multiple operations into a single operation accumulated over a predetermined interval of time, at 709. Thus, in some instances, the OT manager 225B can send instructions to execute a single operation corresponding to one or more aggregated changes to the front-end synchronized application 217B, at 711. Accordingly, the front-end synchronized application can execute a single operation, at 713, and can initiate an event to communicate synchronization instructions to the front-end synchronized application renderer 231B, at 715. Thereafter the front-end synchronized application renderer 231B performs the synchronization of the front-end synchronized application (e.g., on a shared display), at 717. At this point the instance of the front-end synchronized application in the compute device 107 is synchronized with the instance of the front-end synchronized application in the compute device 105 shown in FIG. 6.

Although various example embodiments are described with respect to a front-end synchronized application (e.g., joint session in which multiple users can interact via a multiple instances of a graphical user interface), it is contemplated that various example implementations of the distributed shared memory and disclosed processes are also applicable to other equivalent and/or suitable technologies, including virtual reality interfaces, augmented reality interfaces, tangible user interfaces, backend processes, and other suitable human-computer interfaces and/or system-to-system interfaces.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

The invention claimed is:

1. An apparatus, comprising:
a compute device memory including a first instance of a distributed shared memory configured to be implemented by a plurality of compute devices that implement a decentralized front-end application using the distributed shared memory, each compute device from the plurality of compute devices including an instance of the distributed shared memory, each compute device from the plurality of compute devices in direct communication with a subset of each remaining compute device from the plurality of compute devices via a different decentralized communication session; and
a processor of a first compute device from the plurality of compute devices, the processor operatively coupled to the compute device memory,
the processor configured to instantiate a first instance of the decentralized front-end application coupled to the first instance of the distributed shared memory,
the processor further configured to:
  receive, at the first instance of the decentralized front-end application, an input signal to update a state of the first instance of the decentralized front-end application;
  insert, based on the input signal, a value into a first field data structure defined in the first instance of the distributed shared memory, the first field data structure being from a plurality of field data structures arraigned in a tree structure;
  propagate an indication of the value of the first field data structure to update a second field data structure from the plurality of field data structures, the second field data structure being at least one of an ancestor or a descendent to the first field data structure, the second field data structure associated with an event listener configured through a second instance of the distributed shared memory, the first field data structure not being associated with an event listener configured through the second instance of the distributed shared memory; and
  send, an update signal to a second compute device from the plurality of compute devices that implement the decentralized front-end application to update the second instance of the distributed shared memory such that a state of a second instance of the decentralized front-end application is updated to match the state of the first instance of the decentralized front-end application based on the event listener detecting that the second field data structure is updated and not based directly on the value of the first field data structure.

2. The apparatus of claim 1, wherein the processor is configured to send the update signal to the second compute device via a peer-to-peer communication session established between the first compute device and the second compute device.

3. The apparatus of claim 1, wherein the processor is configured to send the update signal such that the second instance of the decentralized front-end application is updated in near real-time after the input signal is received at the first instance of the decentralized front-end application.

4. The apparatus of claim 1, wherein the state of the first instance of the decentralized front-end application is defined by a fixed set of properties associated with graphical elements rendered by the first instance of the decentralized front-end application on a display operatively coupled to the processor, each property in the fixed set of properties includes a discrete value.

5. A non-transitory processor-readable medium storing code representing instructions to be executed by a processor, the code comprising executable instructions to cause the processor to:
instantiate a first instance of a decentralized front-end application coupled to an instance of a distributed shared memory included within a first compute device configured to be included in a plurality of compute devices that implements the distributed shared memory and the decentralized front-end application, each compute device from the plurality of compute devices includes an instance of the distributed shared memory and an instance of the decentralized front-end application, and each compute device from the plurality of compute devices in communication with each remaining compute device from the plurality of compute devices via a different decentralized communication session;
register a first event listener with a first node of a tree structure defined in a second instance of the decentralized front-end application included within a second compute device from the plurality of compute devices;
receive, at the first compute device, an event object associated with the first node, the event object generated at the second compute device in response to an input signal received at the second instance of the decentralized front-end application;
determine, based on receiving the event object, that a time to perform an end-to-end synchronization between the first instance of the front-end application and the second instance of the front-end application is longer than a predetermined time threshold; and
register a second event listener with a second node of the tree structure defined in the second instance of the decentralized front-end application included within the second compute device based on the time to perform an end-to-end synchronization being longer than the predetermined time threshold, the second node being at least one of a parent or an ancestor to the first node.

6. The non-transitory processor readable medium of claim 5, wherein the event object is a first event object, the code further comprising executable instructions to cause the processor to:
receive, at the first compute device, a second event object associated with the second node;
update a value of the second node in the first instance of the decentralized front end application based on the second event object;
perform an event flow process, at the first compute device and based on the second event node, over the tree structure;
propagate an indication of a change to a set of nodes that are ancestors of the second node, upon a determination that a change was made to a value stored in the second node; and
change a value in at least one node from the set of nodes that are ancestors of the second node, based at least on the value of the second node.

7. The non-transitory processor readable medium of claim 5, wherein the event object is a first event object, the code further comprising executable instructions to cause the processor to:
receive, at the first compute device, a second event object associated with the second node;
update a value of the second node in the first instance of the decentralized front end application based on the second event object;
perform an event flow process, at the first compute device and based on the second event node, over the tree structure;
propagate an indication of a change to a set of nodes that are ancestors of the second node, upon a determination that a change was made to a value stored in the second node; and
change a value in at least one node element from the set of nodes that are descendants of the second node, based at least on the value of the second node.

8. The non-transitory processor readable medium of claim 5, the code further comprising executable instructions to cause the processor to:
implement a conflict resolution policy to prioritize event objects based on event object generation time, at the distributed shared memory.

9. The non-transitory processor readable medium of claim 5, the code further comprising executable instructions to cause the processor to:
implement a conflict resolution policy to prioritize event objects resulting from changes made to the distributed shared memory by a third compute device from the plurality of compute devices.

10. A method, comprising:
instantiating, at a first compute device from a plurality of a compute devices, a first instance of a decentralized front-end application logically coupled to an instance of a distributed shared memory, the distributed shared memory implemented by the plurality of compute devices coupled via a computer network, each compute device from the plurality of compute devices implementing an instance of the decentralized front-end application coupled to a different instance of the distributed shared memory, each compute device from the plurality of compute devices in communication with each remaining compute device from the plurality of compute devices via a different decentralized communication session;
receiving, at the first instance of the decentralized front-end application, an input signal associated with a state of the first instance of the decentralized front-end application;
determining, based on the input signal, a first data value associated with a field data structure defined in the instance of the distributed shared memory logically coupled to the first instance of the decentralized front-end application;
aggregating the first data value with a second data value from a set of aggregated data values stored in a consolidated operation data structure;
inserting the set of aggregated data values into a set of field data structures defined in the instance of the distributed shared memory logically coupled to the first instance of the decentralized front-end application, upon a determination that a time dependent threshold has been reached;
generating an event object indicative of the set of aggregated data values inserted into the set of field data structures defined in the instance of the distributed shared memory logically coupled to the first instance of the decentralized front-end application; and
sending the event object to a second compute device from the plurality of compute devices to update a second instance of the decentralized front-end application such that a state of the second instance of the decentralized front-end application matches the state of the first instance of the decentralized front-end application.

11. The method of claim 10, wherein the field data structure is a first field data structure and the event object is a first event object, the method further comprising:
receiving a second event object associated with the instance of the distributed shared memory logically coupled to the first instance of the decentralized front-end application, the second event object generated by an event source in response to a change made to the distributed shared memory via the second compute device;
determining based on the second event object, a second field data structure defined in the instance of the distributed shared memory logically coupled to the first instance of the decentralized front-end application; and
updating the first instance of the decentralized front-end application based on a value stored in the second field data structure.

12. The method of claim 10, further comprising:
configuring a set of event sources, each event source from the set of event sources associated with at least one field data structure defined in the instance of the distributed shared memory and being configured by the first compute device through a registration of an event listener with the at least one field data structure,
the set of event sources being different from a set of event sources configured by the second compute device.

13. The method of claim 10, further comprising:
executing an event flow process over a hierarchical data structure including a set of node elements, each node element from the set of node elements uniquely associated with at least one field data structure defined in the instance of the distributed shared memory logically coupled to the first instance of the decentralized front-end application;
propagating an indication of a change to a set of node elements that are ancestors of a targeted node element from the set of node elements, upon a determination that a change was made to a value stored in the targeted node element; and
updating the first instance of the decentralized front-end application according to one or more values changed in the instance of the distributed shared memory logically coupled to the first instance of the decentralized front-end application.

14. The method of claim 10, further comprising:
executing an event flow process over a hierarchical data structure including a first set of node elements, each node element from the first set of node elements uniquely associated with at least one field data structure defined in the instance of the distributed shared memory logically coupled to the first instance of the decentralized front-end application;
propagating an indication of a change to a second set of node elements that are descendants of a targeted node element from the first set of node elements, upon a determination that a change was made to a value stored in the targeted node element; and
updating the first instance of the decentralized front-end application according to one or more values changed in the instance of the distributed shared memory logically coupled to the first instance of the decentralized front-end application.

15. The method of claim 10, wherein the field data structure is a first field data structure, the method further comprising:
registering an event listener with a second field data structure defined in the instance of the distributed shared memory logically coupled to the first instance of the decentralized front-end application upon a determination that a time to perform an end-to-end synchronization between the first instance of the decentralized front-end application and the second instance of the decentralized front-end application is longer than a predetermined time threshold.

16. The method of claim 10, wherein the second instance of the decentralized front-end application is updated in near real-time after the input signal is received at the first instance of the decentralized front-end application.

17. The method of claim 10, wherein the state of the first instance of the decentralized front-end application is defined by a fixed set of properties associated with graphical elements rendered by the first instance of the decentralized front-end application on a display operatively coupled to the first compute device, each property in the fixed set of properties includes a discrete value.

18. The method of claim 10, wherein the first instance of the decentralized front-end application and the second instance of the decentralized front-end application are part of a peer-to-peer joint session having equally privileged participants.

19. A method, comprising:
initiating, at a first compute device from a plurality of compute devices, a peer-to-peer joint session of a decentralized front-end application, the peer-to-peer joint session including a plurality of instances of the decentralized front-end application, each instance of the decentralized front-end application from the plurality of instances of the decentralized front-end application coupled to an instance of a distributed shared memory implemented in a different compute device from the plurality of compute devices that implement the distributed shared memory, the distributed shared memory including a tree structure having a plurality of nodes, each node from the plurality of nodes associated with a field data structure configured to store a value associated with properties of elements displayed on the plurality of instances of the decentralized front-end application, and each instance of the decentralized front-end application from the plurality of instances of the decentralized front-end application instantiated in a different compute device from the plurality of compute devices;
registering an event listener with a first node from the plurality of nodes defined in an instance of the decentralized front-end application included within a second compute device from the plurality of compute devices;
receiving, at the first compute device, an event object indicative of a change to the first node in the instance of the decentralized front-end application included within the second compute device;
inserting, based on the event object, a first value into a field data structure associated with the first node at an instance of the decentralized front-end application included within the first compute device based on the event object; and
inserting, based on the value inserted into the field data structure associated with the first node at the instance of the decentralized front-end application included within the first compute device, a second value into a field data structure associated with a second node at the instance of the decentralized front-end application included within the first compute device, the second node being at least one of an ancestor or a descendant of the first node in the tree structure.

\* \* \* \* \*